US009525560B2

(12) United States Patent
Hao et al.

(10) Patent No.: US 9,525,560 B2
(45) Date of Patent: Dec. 20, 2016

(54) METHOD, DEVICE, AND SYSTEM FOR TRANSMITTING MULTICAST PACKET ACROSS LAYER 2 VIRTUAL NETWORK

(71) Applicant: Huawei Technologies Co., Ltd., Shenzhen (CN)

(72) Inventors: Weiguo Hao, Nanjing (CN); Guangrui Wu, Nanjing (CN); Yihong Li, Beijing (CN); Chengsong Zhang, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 43 days.

(21) Appl. No.: 14/748,777

(22) Filed: Jun. 24, 2015

(65) Prior Publication Data
US 2015/0372828 A1 Dec. 24, 2015

(30) Foreign Application Priority Data

Jun. 24, 2014 (CN) .......................... 2014 1 0289737

(51) Int. Cl.
*H04L 12/18* (2006.01)
*H04L 12/46* (2006.01)
*H04L 12/721* (2013.01)
*H04L 12/753* (2013.01)
*H04L 12/761* (2013.01)
(Continued)

(52) U.S. Cl.
CPC ............ *H04L 12/185* (2013.01); *H04L 12/18* (2013.01); *H04L 12/462* (2013.01); *H04L 12/4633* (2013.01); *H04L 45/16* (2013.01); *H04L 45/48* (2013.01); *H04L 45/66* (2013.01); (Continued)

(58) Field of Classification Search
None
See application file for complete search history.

(56) References Cited

U.S. PATENT DOCUMENTS

2012/0327836 A1* 12/2012 Narayanasamy ... H04W 76/022
370/312
2013/0182581 A1* 7/2013 Yeung ................. H04L 12/1877
370/244

(Continued)

OTHER PUBLICATIONS

Foreign Communication From a Counterpart Application, European Application No. 15173003.3, Extended European Search Report dated Nov. 13, 2015, 5 pages.

*Primary Examiner* — Mohammad Adhami
(74) *Attorney, Agent, or Firm* — Conley Rose, P.C.

(57) ABSTRACT

A gateway receives a link state packet (LSP) that includes a network identifier of a Layer 2 virtual network and a multicast address and that is sent by each routing bridge (RB) that is on the Transparent Interconnection of Lots of Links (TRILL) network; separately performs calculation on the network identifier and the multicast address that are in each LSP, to obtain a calculation result corresponding to each combination of the network identifier and the multicast address; if the gateway determines that information preconfigured on the gateway matches a calculation result corresponding to a combination of the network identifier and the multicast address, sends a notification message including the network identifier and the multicast address that are in the matched combination to each RB; receives from at least one RB, a multicast packet corresponding to the multicast address in the matched combination, and forwards the multicast packet.

18 Claims, 8 Drawing Sheets

(51) Int. Cl.
*H04L 12/741* (2013.01)
*H04L 12/931* (2013.01)
*H04L 12/723* (2013.01)

(52) U.S. Cl.
CPC ............ H04L 45/74 (2013.01); H04L 49/201 (2013.01); *H04L 45/50* (2013.01); *H04L 2012/4629* (2013.01)

(56) References Cited

U.S. PATENT DOCUMENTS

| | | | |
|---|---|---|---|
| 2013/0201986 A1* | 8/2013 | Sajassi | H04L 45/48 370/390 |
| 2015/0023352 A1* | 1/2015 | Yang | H04L 12/462 370/392 |
| 2015/0341183 A1* | 11/2015 | Song | H04L 12/1886 370/390 |

* cited by examiner

A routing bridge separately sends an LSP to each gateway that is on a TRILL network, where the LSP includes: a network identifier of a Layer 2 virtual network and a multicast address, and the LSP is used to enable each gateway to perform calculation on the network identifier and the multicast address that are in the LSP and to match a calculation result with information preconfigured on the gateway ⟋301

The routing bridge receives a notification message sent by a first gateway, where the first gateway is a gateway on the TRILL network and information preconfigured on the gateway matches a calculation result corresponding to a combination of the network identifier and the multicast address ⟋302

The routing bridge sends a multicast packet corresponding to the multicast address to the first gateway, so that the first gateway forwards the multicast packet ⟋303

FIG. 3

METHOD, DEVICE, AND SYSTEM FOR TRANSMITTING MULTICAST PACKET ACROSS LAYER 2 VIRTUAL NETWORK

CROSS-REFERENCE TO RELATED APPLICATION

This application claims priority to Chinese Patent Application No. 201410289737.X. filed on Jun. 24, 2014, which is hereby incorporated by reference in its entirety.

TECHNICAL FIELD

The present disclosure relates to the computer network field, and in particular, to a method, device, and system for transmitting a multicast packet across Layer 2 virtual networks on a Transparent Interconnection of Lots of Links (TRILL) network.

BACKGROUND

The TRILL protocol, recommended by the Internet Engineering Task Force (IETF), is a routing protocol according to which calculation is performed based on a link state on a Layer 2 network, to resolve a deficiency in a Spanning Tree Protocol (STP) in a large data center. The data center may use TRILL to build a large Layer 2 network, to overcome shortcomings of a traditional Layer 2 network: a low bandwidth utilization and slow convergence.

FIG. 1 is a schematic architectural diagram of a TRILL network in the prior art. As shown in FIG. 1, the TRILL network uses a two-layer structure, including multiple routing bridges (RB) having an access function, and multiple gateways having a forwarding function. On the TRILL network, a same TRILL physical network may be shared by different tenants (a tenant refers to a user using a system and computer computing resource). Each tenant uses at least one Layer 2 virtual network. Each Layer 2 virtual network is identified by a 12-bit virtual local area network identifier (VLAN ID) or a 24-bit fine grained label (FGL). Each Layer 2 virtual network may include multiple terminals. Different terminals on a same Layer 2 virtual network may access different RBs, and the different terminals can communicate with each other by using one or more RBs. A multicast packet may be forwarded between terminals of different Layer 2 virtual networks by using any gateway that is on the TRILL network.

Generally, on a TRILL network, according to a Protocol Independent Multicast (PIM) protocol, each Layer 2 virtual network specifies a gateway that forwards a multicast packet for the Layer 2 virtual network, that is, only the gateway specified by the Layer 2 virtual network can copy and forward a multicast packet sent by each terminal that is on the Layer 2 virtual network. For example, in FIG. 1, assuming that terminal 1 and terminal 3 are on Layer 2 virtual network VLAN 10 (the VLAN 10 is not shown in FIG. 1) and a specified gateway of Layer 2 virtual network VLAN 10 is gateway 1, only gateway 1 can forward a multicast packet that is on the VLAN 10. In this case, if terminal 1 sends 1,000 groups of different multicast packets, the 1,000 groups of multicast packets can be copied and forwarded across Layer 2 virtual networks by using only gateway 1.

Due to the one-to-one correspondence between a gateway and a Layer 2 virtual network, all multicast packets on a Layer 2 virtual network are copied and forwarded by using a fixed gateway. Therefore, when a large number of multicast packets on a Layer 2 virtual network need to be forwarded, a specified gateway of the Layer 2 virtual network has a relatively heavy burden.

SUMMARY

The present disclosure provides a method, device, and system for transmitting a multicast packet across Layer 2 virtual networks on a TRILL network, to resolve a problem in the prior art that when a large number of multicast packets need to be forwarded on a Layer 2 virtual network, a gateway transmitting a multicast packet for the Layer 2 virtual network is overburdened.

According to a first aspect, the present disclosure provides a method for transmitting a multicast packet across Layer 2 virtual networks on a TRILL network, including receiving, by a gateway, a link state packet (LSP) sent by each RB, where each LSP includes a network identifier of a Layer 2 virtual network and a multicast address; separately performing, by the gateway, calculation on the network identifier and the multicast address that are in each LSP, to obtain a calculation result corresponding to each combination of the network identifier and the multicast address; if the gateway determines that information preconfigured on the gateway matches a calculation result corresponding to a combination of the network identifier and the multicast address, sending a notification message to each RB that is on the TRILL network, where the notification message includes the network identifier and the multicast address that are in the matched combination; and receiving, by the gateway from at least one RB, a multicast packet corresponding to the multicast address in the matched combination, and forwarding the multicast packet.

According to a second aspect, the present disclosure provides a method for transmitting a multicast packet across Layer 2 virtual networks on a TRILL network, including separately sending, by a RB, an LSP to each gateway that is on the TRILL network, where the LSP includes a network identifier of a Layer 2 virtual network and a multicast address, and the LSP is used to enable each gateway to perform calculation on the network identifier and the multicast address that are in the LSP and to match a calculation result with information preconfigured on the gateway; receiving, by the RB, a notification message sent by a first gateway, where the first gateway is a gateway on the TRILL network and information preconfigured on the gateway matches a calculation result corresponding to a combination of the network identifier and the multicast address; and sending, by the RB, a multicast packet corresponding to the multicast address to the first gateway.

According to a third aspect, the present disclosure provides a gateway, including a receiving module configured to receive an LSP sent by each RB, where each LSP includes a network identifier of a Layer 2 virtual network and a multicast address; a calculation module configured to separately perform calculation on the network identifier and the multicast address that are in each LSP received by the receiving module, to obtain a calculation result corresponding to each combination of the network identifier and the multicast address; a sending module configured to, if the gateway determines that information preconfigured on the gateway matches a calculation result corresponding to a combination of the network identifier and the multicast address, send a notification message to each RB that is on a TRILL network, where the notification message includes the network identifier and the multicast address that are in the matched combination; a multicast packet receiving module configured to receive, from at least one RB, a multicast packet corresponding to the multicast address in the matched combination; and a multicast packet forwarding module configured to forward the multicast packet received by the multicast packet receiving module.

According to a fourth aspect, the present disclosure provides a RB, including a sending module configured to separately send an LSP to each gateway that is on a TRILL network, where the LSP includes a network identifier of a Layer 2 virtual network and a multicast address, and the LSP is used to enable each gateway to perform calculation on the network identifier and the multicast address that are in the LSP and to match a calculation result with information preconfigured on the gateway; a receiving module configured to receive a notification message sent by a first gateway, where the first gateway is a gateway on the TRILL network and information preconfigured on the gateway matches a calculation result corresponding to a combination of the network identifier and the multicast address; and a multicast packet sending module configured to send a multicast packet corresponding to the multicast address to the first gateway.

According to a fifth aspect, the present disclosure provides a system for transmitting a multicast packet across Layer 2 virtual networks on a TRILL network, including a terminal, the gateway according to the third aspect, and the RB according to the fourth aspect.

According to a method, device, and system for transmitting a multicast packet across Layer 2 virtual networks on a TRILL network provided by the present disclosure, after receiving an LSP that includes a Layer 2 virtual network identifier and a multicast address and that is sent by a RB, a gateway separately performs calculation on the network identifier and the multicast address that are in each LSP, to obtain a calculation result corresponding to each combination of the network identifier and the multicast address; if determining that information preconfigured on the gateway matches a calculation result corresponding to a combination of the network identifier and the multicast address, the gateway sends a notification message to the RB, so that the RB sends a multicast packet corresponding to the multicast address to the gateway, and the gateway forwards the multicast packet. In this way, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

BRIEF DESCRIPTION OF DRAWINGS

To describe the technical solutions in the embodiments of the present disclosure or in the prior art more clearly, the following briefly introduces the accompanying drawings required for describing the embodiments or the prior art. The accompanying drawings in the following description show merely some embodiments of the present disclosure, and a person of ordinary skill in the art may still derive other drawings from these accompanying drawings without creative efforts.

FIG. 3 is a flowchart of a method for transmitting a multicast packet across Layer 2 virtual networks on a TRILL network according to another embodiment of the present disclosure;

DESCRIPTION OF EMBODIMENTS

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 2:
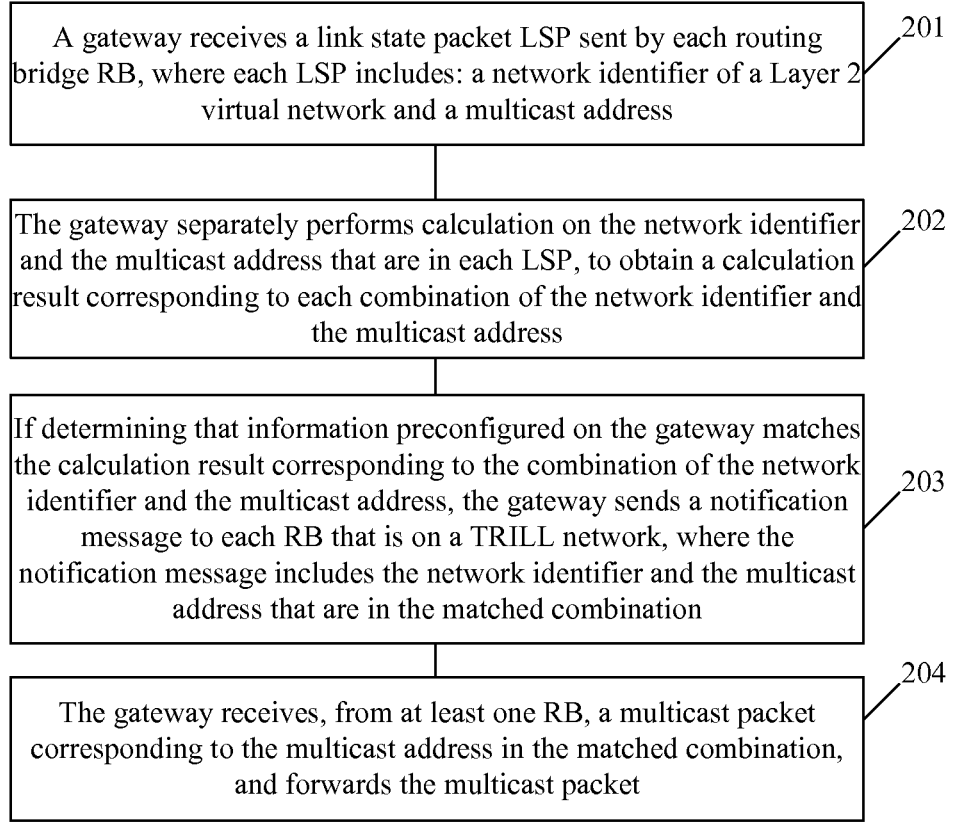
FIG. 2 is a flowchart of a method for transmitting a multicast packet across Layer 2 virtual networks on a TRILL network according to an embodiment of the present disclosure.

FIG. 2 is a flowchart of a method for transmitting a multicast packet across Layer 2 virtual networks on a TRILL network according to an embodiment of the present disclosure. As shown in FIG. 2, the method provided by the embodiment of the present disclosure may include the following steps.

201: A gateway receives an LSP sent by each RB, where each LSP includes a network identifier of a Layer 2 virtual network and a multicast address.

It should be noted that in the embodiment of the present disclosure, the gateway is any gateway on the TRILL network, that is, each gateway on the TRILL network receives the LSP sent by each RB. Preferably, the gateway may be a router supporting a Layer 3 multicast function or a Layer 3 core switch.

The LSP may be a TRILL link state protocol data unit (LSPDU).

The RB is any switch that is on the TRILL network, has a Layer 2 access function, and can receive a multicast packet sent by a terminal (a multicast source) to which the switch is connected.

The network identifier of the Layer 2 virtual network may be indicated by a 12-bit VLAN ID, or may be indicated by a 24-bit FGL.

The multicast address is any of class D Internet Protocol (IP) addresses ranging from 224.0.0.0 to 239.255.255.255, and is used to identify a multicast group. The multicast group is a set of terminals that receive a multicast packet.

Preferably, the LSP is formed by encapsulating the multicast address and the network identifier, where the multicast address is obtained by the RB according to an Internet Group Management Protocol (IGMP) packet that is sent by the terminal and received from an IGMP packet ingress port, and the network identifier is of the Layer 2 virtual network on which the terminal is located, and is obtained according to a port number of the ingress port and a preset correspondence table of a port number of an ingress port and a network identifier of a Layer 2 virtual network. The IGMP packet includes the multicast address.

202: The gateway separately performs calculation on the network identifier and the multicast address that are in each LSP, to obtain a calculation result corresponding to each combination of the network identifier and the multicast address.

Preferably, the gateway may separately perform data conversion on the network identifier and the multicast address that are in each LSP, and perform computation in combination with a total number of gateways that are on the TRILL network, to obtain the calculation result corresponding to each combination of the network identifier and the multicast address.

The network identifier may be a 12-bit VLAN ID, or may be a 24-bit FGL. Therefore, the calculation result corresponding to the combination of the network identifier and the multicast address may be obtained by using the following two manners according to different network identifiers.

(1) The network identifier is a 12-bit VLAN ID; the multicast address is a class D IP address Group Address; the total number of gateways is an integer k; and the calculation result corresponding to the combination of the network identifier and the multicast address is m, and m=(VLAN ID<<32+Group Address)%k, where "<<" indicates right shifting, "%" indicates performing a modulo operation, and m=(VLAN ID<<32+Group Address)%k indicates first right shifting the 12-bit VLAN ID by 32 bits, then adding it to the multicast address, and finally, determining a remainder as a value of m after a result of addition is divided by k.

(2) The network identifier is a 24-bit FGL; the multicast address is a class D IP address Group Address; the total number of gateways is an integer k; and the calculation result corresponding to the combination of the network identifier and the multicast address is m, and m=((FGL<<k%12|FGL)%k+(Group Address<<k%32|Group Address)%k)%k, where "<<" indicates right shifting, "%" indicates performing a modulo operation, and "|" indicates an OR operation, and m=((FGL<<k%12|FGL)%k+(Group Address<<k%32|Group Address)%k)%k indicates performing an OR operation on a remainder that is obtained after the 24-bit FGL is right shifted by k bits and then divided by 12, and the 24-bit FGL, dividing an OR operation result by k to acquire a first remainder; performing an OR operation on a remainder that is obtained after the multicast address is right shifted by k bits and then divided by 32, and the multicast address, dividing an OR operation result by k to acquire a second remainder; then adding the first remainder and the second remainder; finally, determining a remainder as a value of m after an addition result is divided by k.

The calculation result m corresponding to the combination of the network identifier and the multicast address is in any manner of expression of the foregoing manners (1) and (2), but is not limited to the two manners of expression.

Further, information preconfigured on the gateway is a sequence number of the gateway.

The sequence number is obtained by sorting, in an initialization phase of the TRILL network according to TRILL protocol system identifiers system IDs of the gateways that are on the TRILL network, all the gateways that are on the TRILL network according to a natural number sequence starting from 0 and ending at k−1.

The TRILL protocol system identifier is a natural number, used to identify a gateway on the TRILL network. The sorting may be sorting in descending order according to values of the TRILL protocol system identifiers, may be sorting in ascending order according to values of the TRILL protocol system identifiers, or may be random sorting, which is not limited by the embodiment of the present disclosure. For example, the TRILL network includes 4 gateways that are identified according to TRILL protocol system identifiers of the gateways are gateway 1, gateway 2, gateway 3, and gateway 4. After natural number sequence based number sorting is performed on the 4 gateways, numbers corresponding to gateway 1, gateway 2, gateway 3, and gateway 4 may be 0, 1, 2, and 3.

If the sequence number of the gateway is equal to the calculation result m corresponding to the combination of the network identifier and the multicast address, it indicates that the gateway matches the network identifier and the multicast address, that is, the gateway can forward a multicast packet that is corresponding to the multicast address and that is on a Layer 2 virtual network corresponding to the network identifier.

If the sequence number of the gateway is unequal to the calculation result m corresponding to the combination of the network identifier and the multicast address, it indicates that the gateway does not match the network identifier and the multicast address, that is, the gateway cannot forward a multicast packet that is corresponding to the multicast address and that is on a Layer 2 virtual network corresponding to the network identifier.

For example, on the foregoing TRILL network, if a calculation result of a combination of the VLAN 10 and a multicast address A is 2, the sequence number of gateway 3 matches the calculation result of the combination of the VLAN 10 and the multicast address A, that is, gateway 3 is a gateway forwarding a multicast packet that is corresponding to the multicast address A and that is on the VLAN 10.

203: If determining that information preconfigured on the gateway matches the calculation result corresponding to the combination of the network identifier and the multicast address, the gateway sends a notification message to each RB that is on the TRILL network, where the notification message includes the network identifier and the multicast address that are in the matched combination.

On a TRILL network, a RB needs to first send a multicast packet to a TRILL distribution tree root according to a TRILL distribution tree corresponding to a network identifier and a multicast address, and send, from the TRILL distribution tree root and along the TRILL distribution tree, the multicast packet to a gateway that matches a calculation result of a combination of the network identifier and the multicast address, and the gateway copies and forwards the multicast packet. The TRILL distribution tree is a combination of shortest paths that are from the distribution tree root to another gateway and RB and that are calculated by the RB according to a shortest path first method.

For each TRILL distribution tree, for some paths (that is, branches of the distribution tree) having no potential receiver, a distribution tree pruning operation needs to be performed. In this case, if a gateway that matches a calculation result of a combination of the network identifier and the multicast address and that is on a branch of the distribution tree is pruned off, the gateway in the matched combination cannot receive a multicast packet of a multicast group.

Therefore, to avoid that the gateway in the matched combination cannot receive the multicast packet, further, if the gateway determines that the information preconfigured on the gateway matches a calculation result corresponding to a combination of the network identifier and the multicast address, and the gateway is not a TRILL distribution tree root, the notification message is a first LSP including the network identifier and the multicast address that are in the matched combination.

Correspondingly, the sending the notification message to each RB that is on the TRILL network includes notifying, by the gateway, the network identifier and the multicast address that are in the matched combination to each RB that is on the TRILL network by using the first LSP, so that each RB on the TRILL network disposes, according to the first LSP, the gateway on the TRILL distribution tree corresponding to the network identifier and the multicast address that are in the matched combination, and sends the multicast packet corresponding to the multicast address in the matched combination to the gateway by using the TRILL distribution tree.

Figure 1:
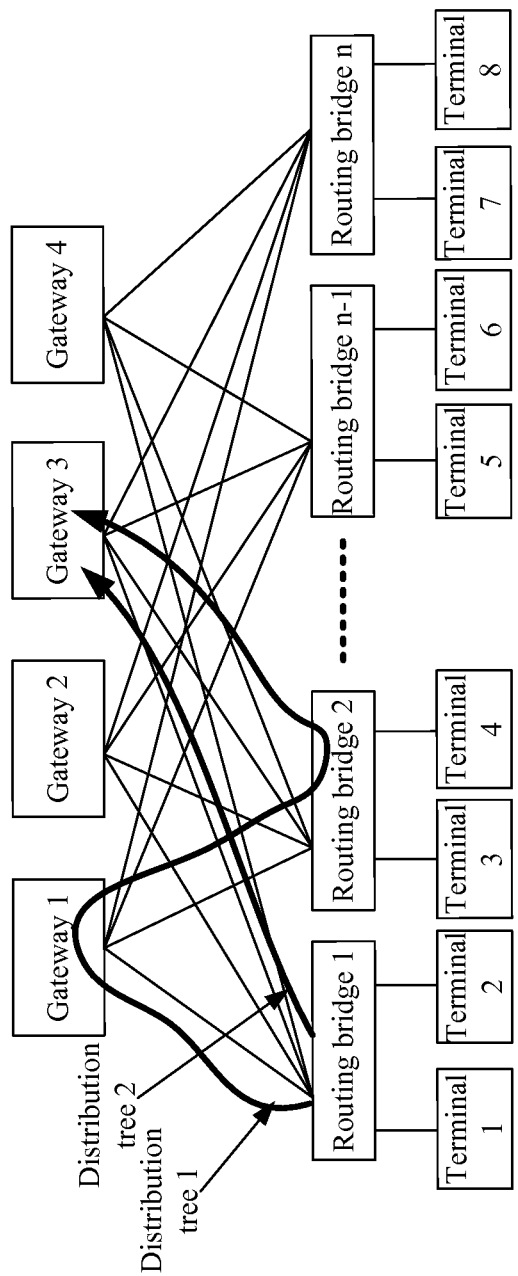
FIG. 1 is a schematic architectural diagram of a TRILL network in the prior art.

In addition, according to the TRILL protocol, at least one TRILL distribution tree root may be automatically selected from all the gateways that are on the TRILL network, and information about a selected TRILL distribution tree root is broadcast to all the gateways and RBs that are on the TRILL network. Before configuring a TRILL distribution tree corresponding to a network identifier and a multicast address, that is, before performing distribution tree calculation, a RB needs to choose a distribution tree root from all selected distribution tree roots as a TRILL distribution tree root corresponding to the network identifier and the multicast address. In this case, if the gateway in the matched combination is a distribution tree root selected by the TRILL protocol, but the RB does not choose the gateway as the TRILL distribution tree root corresponding to the network identifier and the multicast address, in a multicast packet forwarding process, a link detour occurs, wasting a link bandwidth resource. For example, as shown in FIG. 1, terminal 1 is on a VLAN 10, a multicast address of a sent multicast packet is A, and a gateway matching a calculation result of a combination of the VLAN 10 and A is gateway 3. Gateways that may be selected by the TRILL protocol as a TRILL distribution tree root are gateway 1, gateway 3, and gateway 4. RB 1 selects gateway 1 as a TRILL distribution tree root corresponding to the VLAN 10 and A. Therefore, after terminal 1 sends the multicast packet to RB 1, the multicast packet goes along distribution tree 1 (gateway 1→RB 2→gateway 3) to arrive at gateway 3, and gateway 3 copies and forwards the multicast packet. In this case, if RB 1 is enabled to set gateway 3 as the TRILL distribution tree root, the multicast packet is directly sent, along distribution tree 2, to gateway 3, so that no detour occurs in multicast packet forwarding.

Therefore, to resolve a problem that a link detour occurs in multicast packet forwarding and therefore a link bandwidth resource is wasted, further, if the gateway determines that the information preconfigured on the gateway matches a calculation result corresponding to a combination of the network identifier and the multicast address, and the gateway is a TRILL distribution tree root, the notification message is an extended LSP including the network identifier and the multicast address that are in the matched combination and a correspondence between the network identifier and the multicast address that are in the matched combination and the TRILL distribution tree root.

Correspondingly, the sending the notification message to each RB that is on the TRILL network includes notifying, by the gateway by using the extended LSP, the network identifier and the multicast address that are in the matched combination and the correspondence between the network identifier and the multicast address that are in the matched combination and the TRILL distribution tree root to each RB that is on the TRILL network, so that each RB on the TRILL network generates a local multicast entry according to the extended LSP, and sends the multicast packet corresponding to the multicast address in the matched combination to the gateway by using a TRILL distribution tree whose root is the gateway in the matched combination according to the local multicast entry.

204: The gateway receives, from at least one RB, a multicast packet corresponding to the multicast address in the matched combination, and forwards the multicast packet.

According to a method for transmitting a multicast packet across Layer 2 virtual networks on a TRILL network provided by the embodiment of the present disclosure, after receiving an LSP that includes a Layer 2 virtual network identifier and a multicast address and that is sent by a RB, a gateway separately performs calculation on the network identifier and the multicast address that are in each LSP, to obtain a calculation result corresponding to each combination of the network identifier and the multicast address; when determining that information preconfigured on the gateway matches a calculation result corresponding to a combination of the network identifier and the multicast address, the gateway sends a notification message to the RB, receives, from at least one RB, a multicast packet corresponding to the multicast address in the matched combination, and forwards the multicast packet.

In this way, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced. For example, terminal 1 is on Layer 2 virtual network VLAN 10. If terminal 1 sends 1,000 groups of different multicast packets, where a multicast address corresponding to 200 groups of the different multicast packets is A, a multicast address corresponding to 300 groups of the different multicast packets is B, and a multicast address corresponding to 500 groups of the different multicast packets is C, and a gateway matching a calculation result of a combination of the VLAN 10 and A is gateway 1, a gateway matching a calculation result of a combination of the VLAN 10 and B is gateway 2, and a gateway matching a calculation result of a combination of the VLAN 10 and C is gateway 3, the multicast packets that are corresponding to multicast address A and that are in the 1,000 groups of data are forwarded by using gateway 1, the multicast packets that are corresponding to multicast address B and that are in the 1,000 groups of multicast packets are forwarded by using gateway 2, and the multicast packets that are corresponding to multicast address C and that are in the 1,000 groups of data are forwarded by using gateway 3.

FIG. 3 is a flowchart of a method for transmitting a multicast packet across Layer 2 virtual networks on a TRILL network according to another embodiment of the present disclosure. As shown in FIG. 3, the method provided by the embodiment of the present disclosure may include the following steps.

301: A RB separately sends an LSP to each gateway that is on the TRILL network, where the LSP includes a network identifier of a Layer 2 virtual network and a multicast address, and the LSP is used to enable each gateway to perform calculation on the network identifier and the multicast address that are in the LSP and to match a calculation result with information preconfigured on the gateway.

The RB is any switch that is on the TRILL network, has a Layer 2 access function, and can receive a multicast packet sent by a terminal (a multicast source) to which the switch is connected.

302: The RB receives a notification message sent by a first gateway, where the first gateway is a gateway on the TRILL network and information preconfigured on the gateway matches a calculation result corresponding to a combination of the network identifier and the multicast address.

303: The RB sends a multicast packet corresponding to the multicast address to the first gateway, so that the first gateway forwards the multicast packet.

Preferably, to avoid that the first gateway cannot receive the multicast packet, when the first gateway is not a TRILL distribution tree root, the notification message is a first LSP including the network identifier and the multicast address.

Correspondingly, that the RB receives a notification message sent by a first gateway, and sends a multicast packet corresponding to the multicast address to the first gateway includes receiving, by the RB, the first LSP that includes the network identifier and the multicast address and that is sent by the first gateway; disposing, according to the first LSP, the first gateway on a TRILL distribution tree corresponding to the network identifier and the multicast address; and sending the multicast packet corresponding to the multicast address to the first gateway by using the TRILL distribution tree.

In this way, it is ensured that when a pruning operation is performed on the TRILL distribution tree, the first gateway located on a branch of the TRILL distribution tree is not cut off, so that the first gateway can successfully receive the multicast packet.

Preferably, to resolve a problem that a link detour occurs in multicast packet forwarding and therefore a link bandwidth resource is wasted, when the first gateway is a TRILL distribution tree root, the notification message is an extended LSP including the network identifier and the multicast address and a correspondence between the network identifier and the multicast address and the TRILL distribution tree root.

Correspondingly, that the RB receives a notification message sent by a first gateway, and sends a multicast packet corresponding to the multicast address to the first gateway includes receiving, by the RB, the extended LSP that includes the network identifier and the multicast address and the correspondence between the network identifier and the multicast address and the TRILL distribution tree root and that is sent by the first gateway; generating a local multicast entry according to the extended LSP; and sending the multicast packet corresponding to the multicast address to the first gateway by using a TRILL distribution tree whose root is the first gateway according to the local multicast entry.

The local multicast entry includes related information about the TRILL distribution tree corresponding to the network identifier and the multicast address.

In this way, it is implemented that a RB directly sends a multicast packet to a first gateway, thereby preventing a data link detour phenomenon from occurring and improving a link resource utilization rate.

Further, before sending the LSP to each gateway that is on the TRILL network, the method further includes receiving, by the RB from an IGMP packet ingress port, an IGMP packet sent by a terminal (that is, a multicast source); obtaining a multicast address included in the IGMP packet and a network identifier of a Layer 2 virtual network on which the terminal is located; and forming the LSP by encapsulating the multicast address and the network identifier.

Preferably, the RB may determine, according to a preset correspondence table of a port number of an ingress port and a network identifier of a Layer 2 virtual network, the network identifier of the Layer 2 virtual network on which the terminal is located. The correspondence table of a port number of an ingress port and a network identifier of a Layer 2 virtual network is preset by an administrator, which is not limited by the embodiment of the present disclosure. For example, Table 1 is a preset correspondence table of a port number of an ingress port and a network identifier of a Layer 2 virtual network. For convenience of description, the network identifier of the Layer 2 virtual network is a 12-bit VLAN ID, or may be a 24-bit FGL, which is not limited by the present disclosure. As shown in Table 1, if the IGMP packet sent by the terminal is received from an ingress port with a port number being 50, it may be seen, according to a correspondence in Table 1, that the network identifier of the Layer 2 virtual network on which the terminal is located is VLAN 10.

TABLE 1

| Port Number of an Ingress Port | Network Identifier of a Layer 2 Virtual Network |
|---|---|
| 50 | VLAN 10 |
| 60 | VLAN 11 |
| 70 | VLAN 12 |

According to a method for transmitting a multicast packet across Layer 2 virtual networks on a TRILL network provided by the embodiment of the present disclosure, a RB separately sends an LSP to each gateway that is on the TRILL network, where the LSP includes a network identifier of a Layer 2 virtual network and a multicast address, and the LSP is used to enable each gateway to perform calculation on the network identifier and the multicast address that are in the LSP and to match a calculation result with information preconfigured on the gateway; the RB receives a notification message sent by a first gateway, and sends a multicast packet corresponding to the multicast address to the first gateway, so that the first gateway forwards the multicast packet. In this way, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

The following describes in detail a method for transmitting a multicast packet across Layer 2 virtual networks on a TRILL network provided by an embodiment of the present disclosure.

Figure 4:
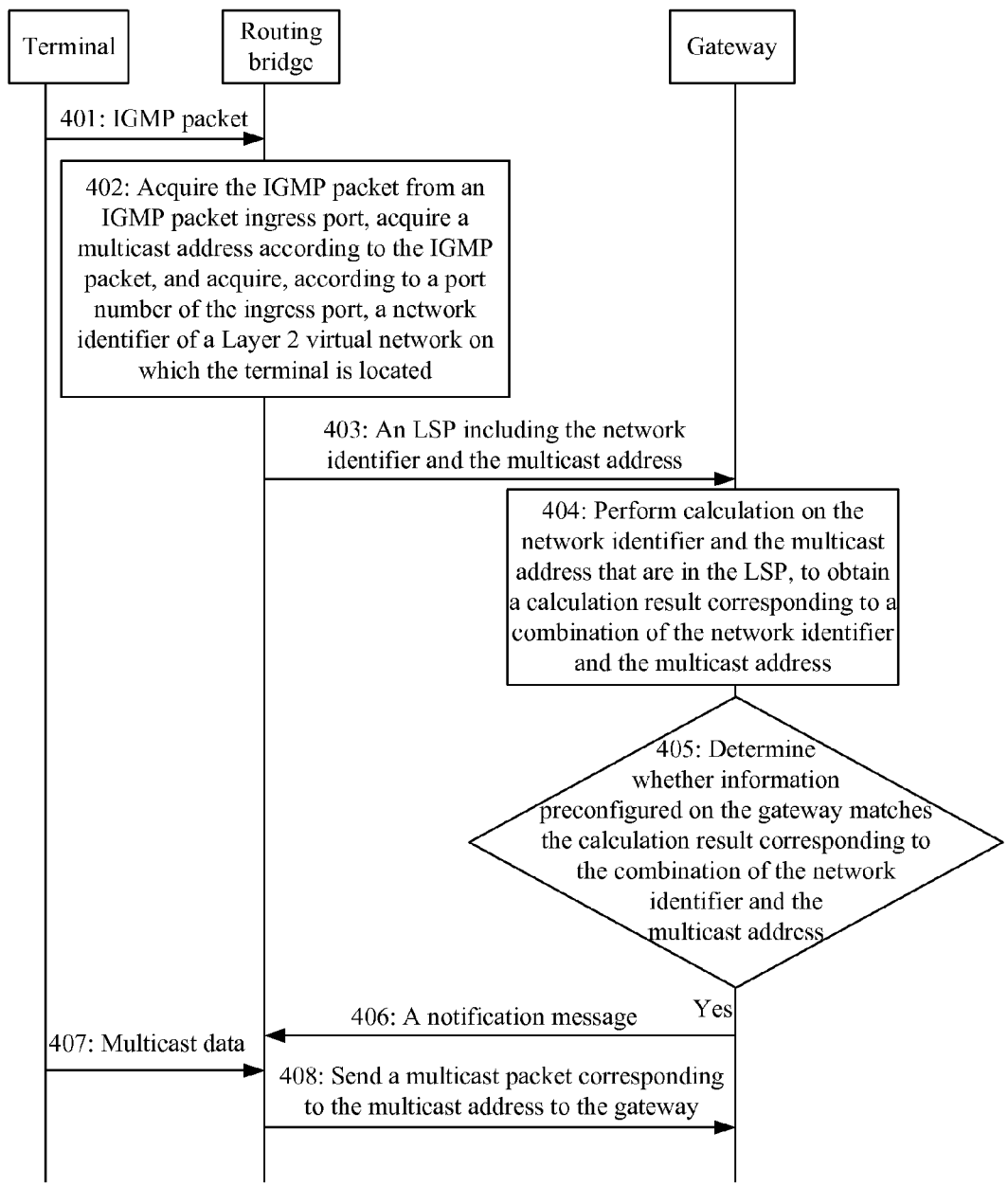
FIG. 4 is a flowchart of a method for transmitting a multicast packet across Layer 2 virtual networks on a TRILL network according to still another embodiment of the present disclosure.

FIG. 4 is a flowchart of a method for transmitting a multicast packet across Layer 2 virtual networks on a TRILL network according to still another embodiment of the present disclosure. As shown in FIG. 4, the method provided by the embodiment of the present disclosure may include the following steps.

401: A terminal sends an IGMP packet to a RB.

The IGMP packet includes a multicast address.

402: The RB acquires the IGMP packet from an IGMP packet ingress port, acquires a multicast address according to the IGMP packet, and acquires, according to a port number of the ingress port, a network identifier of a Layer 2 virtual network on which the terminal is located.

Preferably, the RB determines, according to a preset correspondence table of a port number of an ingress port and a network identifier of a Layer 2 virtual network, and the port number of the IGMP packet ingress port, the network identifier of the Layer 2 virtual network on which the terminal is located. The correspondence table of a port number of an ingress port and a network identifier of a Layer 2 virtual network is preset by an administrator, which is not limited by the embodiment of the present disclosure.

403: The RB sends an LSP including the network identifier and the multicast address to a gateway.

404: The gateway performs calculation on the network identifier and the multicast address that are in the LSP, to obtain a calculation result corresponding to a combination of the network identifier and the multicast address.

405: The gateway determines whether information preconfigured on the gateway matches the calculation result corresponding to the combination of the network identifier and the multicast address, where if the information preconfigured matches the calculation result, execute step 406.

406: The gateway sends a notification message to the RB.

407: The terminal sends a multicast packet to the RB.

408: The RB sends a multicast packet corresponding to the multicast address to the gateway.

For example, as shown in FIG. 1, it is assumed that terminal 1 is a multicast packet sender (that is, a multicast source). Terminal 1 sends an IGMP packet to RB 1 (that is, a RB). RB 1 acquires a multicast address included in the IGMP packet and a network identifier of a Layer 2 virtual network on which the terminal 1 is located. RB 1 notifies the multicast address and the network identifier of the Layer 2 virtual network to gateway 1, gateway 2, gateway 3, and gateway 4 that are on a TRILL network by using an LSP. Gateway 1, gateway 2, gateway 3, and gateway 4 separately determine whether gateway 1, gateway 2, gateway 3, and gateway 4 are a gateway matching a calculation result of a combination of the network identifier and the multicast address. Assuming that gateway 1 calculates that gateway 1 is the gateway matching the multicast address and the network identifier, gateway 1 sends a notification message to all RBs (RB 1 to RB n) that are on the TRILL network, so that RB 1 to RB n separately forward a multicast packet that is corresponding to the multicast address and that is on the Layer 2 virtual network corresponding to the network identifier to gateway 1, and gateway 1 copies and forwards the multicast packet.

According to a method for transmitting a multicast packet across Layer 2 virtual networks on a TRILL network provided by the embodiment of the present disclosure, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

Figure 5:
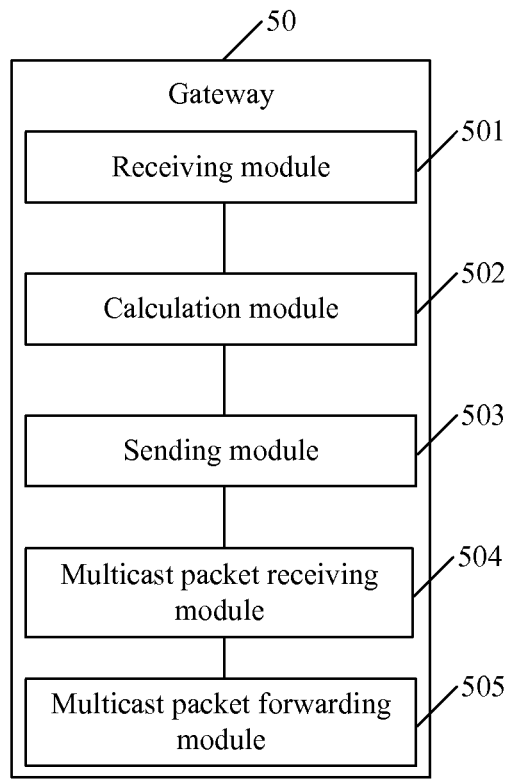
FIG. 5 is a schematic structural diagram of a gateway according to an embodiment of the present disclosure.

FIG. 5 is a schematic structural diagram of a gateway 50 according to an embodiment of the present disclosure. As shown in FIG. 5, the gateway 50 includes a receiving module 501, a calculation module 502, a sending module 503, a multicast packet receiving module 504, and multicast packet forwarding module 505.

A receiving module 501 is configured to receive an LSP sent by each RB.

Each LSP includes a network identifier of a Layer 2 virtual network and a multicast address.

The LSP may be a TRILL LSPDU.

The RB is any switch that is on a TRILL network, has a Layer 2 access function, and can receive a multicast packet sent by a terminal (a multicast source) to which the switch is connected.

The network identifier of the Layer 2 virtual network may be indicated by a 12-bit VLAN ID, or may be indicated by a 24-bit FGL.

The multicast address is any of class D IP addresses ranging from 224.0.0.0 to 239.255.255.255, and is used to identify a multicast group. The multicast group is a set of terminals that receive a multicast packet.

Preferably, the LSP is formed by encapsulating the multicast address and the network identifier, where the multicast address is obtained by the RB according to an IGMP packet that is sent by the terminal and received from an IGMP packet ingress port, and the network identifier is of the Layer 2 virtual network on which the terminal is located, and is obtained according to a port number of the ingress port and a preset correspondence table of a port number of an ingress port and a network identifier of a Layer 2 virtual network. The IGMP packet includes the multicast address.

A calculation module 502 is configured to separately perform calculation on the network identifier and the multicast address that are in each LSP received by the receiving module, to obtain a calculation result corresponding to each combination of the network identifier and the multicast address.

A sending module 503 is configured to, if the gateway determines that information preconfigured on the gateway matches a calculation result corresponding to a combination of the network identifier and the multicast address, send a notification message to each RB that is on the TRILL network, where the notification message includes the network identifier and the multicast address that are in the matched combination.

A multicast packet receiving module 504 is configured to receive, from at least one RB, a multicast packet corresponding to the multicast address in the matched combination.

A multicast packet forwarding module 505 is configured to forward the multicast packet received by the multicast packet receiving module 504.

Further, the calculation module 502 is configured to separately perform data conversion on the network identifier and the multicast address that are in each LSP, and perform computation in combination with a total number of gateways that are on the TRILL network, to obtain the calculation result corresponding to each combination of the network identifier and the multicast address.

The network identifier may be a 12-bit VLAN ID, or may be a 24-bit FGL. Therefore, the calculation module 502 is configured to obtain, by calculating according to a calculation formula in the following (1) or (2), the calculation result corresponding to each combination of the network identifier and the multicast address.

(1) The network identifier is a 12-bit VLAN ID; the multicast address is a class D IP address Group Address; the total number of gateways is an integer k; the calculation result corresponding to the combination of the network identifier and the multicast address is m; and the calculation module 502 obtains, according to a formula m=(VLAN ID<<32+Group Address)%k, the calculation result corresponding to each combination of the network identifier and the multicast address, where "<<" indicates right shifting, "%" indicates performing a modulo operation, and m=(VLAN ID<<32+Group Address)%k indicates first right shifting the 12-bit VLAN ID by 32 bits, then adding it to the multicast address, and finally, determining a remainder as a value of m after a result of addition is divided by k.

(2) The network identifier is a 24-bit FGL; the multicast address is a class D IP address Group Address; the total number of gateways is an integer k; the calculation result corresponding to the combination of the network identifier and the multicast address is m; and the calculation module 502 obtains, according to a formula m=((FGL<<k%12|FGL)%k+(Group Address<<k%32|Group Address)%k)%k, the calculation result corresponding to each combination of the network identifier and the multicast address, where "<<" indicates right shifting, "%" indicates performing a modulo operation, "|" indicates an OR operation, and m=((FGL<<k%12|FGL)%k+(Group Address<<k%32|Group Address)%k)%k indicates performing an OR operation on a remainder that is obtained after the 24-bit FGL is right shifted by k bits and then divided by 12, and the 24-bit FGL, dividing an OR operation result by k to acquire a first remainder; performing an OR operation on a remainder that is obtained after the multicast address is right shifted by k bits and then divided by 32, and the multicast address, dividing an OR operation result by k to acquire a second remainder; then adding the first remainder and the second remainder; finally, determining a remainder as a value of m after an addition result is divided by k.

The calculation result m corresponding to the combination of the network identifier and the multicast address is in any manner of expression of the foregoing manners (1) and (2), but is not limited to the two manners of expression.

The information preconfigured on the gateway is a sequence number of the gateway. The sequence number is obtained by sorting, in an initialization phase of the TRILL network according to TRILL protocol system identifiers (system IDs) of the gateways that are on the TRILL network, all the gateways that are on the TRILL network according to a natural number sequence starting from 0 and ending at k−1.

Correspondingly, the sending module 503 is configured to, if the sequence number of the gateway is equal to the calculation result m corresponding to the combination of the network identifier and the multicast address, send the notification message to each RB that is on the TRILL network.

Further, if the gateway determines that the information preconfigured on the gateway matches a calculation result corresponding to a combination of the network identifier and the multicast address, and the gateway is not a TRILL distribution tree root, the notification message is a first LSP including the network identifier and the multicast address that are in the matched combination.

Correspondingly, the sending module 503 is configured to notify the network identifier and the multicast address that are in the matched combination to each RB that is on the TRILL network by using the first LSP, so that each RB on the TRILL network disposes, according to the first LSP, the gateway on the TRILL distribution tree corresponding to the network identifier and the multicast address that are in the matched combination, and sends the multicast packet corresponding to the multicast address in the matched combination to the gateway by using the TRILL distribution tree.

Further, if the gateway determines that the information preconfigured on the gateway matches a calculation result corresponding to a combination of the network identifier and the multicast address, and the gateway is a TRILL distribution tree root, the notification message is an extended LSP including the network identifier and the multicast address that are in the matched combination and a correspondence between the network identifier and the multicast address that are in the matched combination and the TRILL distribution tree root.

Correspondingly, the sending module 503 is configured to notify, by using the extended LSP, the network identifier and the multicast address that are in the matched combination and the correspondence between the network identifier and the multicast address that are in the matched combination and the TRILL distribution tree root to each RB that is on the TRILL network, so that each RB on the TRILL network generates a local multicast entry according to the extended LSP, and sends the multicast packet corresponding to the multicast address in the matched combination to the gateway by using a TRILL distribution tree whose root is the gateway in the matched combination according to the local multicast entry.

According to a gateway provided by the embodiment of the present disclosure, after receiving an LSP that includes a Layer 2 virtual network identifier and a multicast address and that is sent by a RB, the gateway separately performs calculation on the network identifier and the multicast address that are in each LSP, to obtain a calculation result corresponding to each combination of the network identifier and the multicast address; when determining that information preconfigured on the gateway matches a calculation result corresponding to a combination of the network identifier and the multicast address, the gateway sends a notification message to the RB, receives, from at least one RB, a multicast packet corresponding to the multicast address in the matched combination, and forwards the multicast packet. In this way, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

Figure 6:
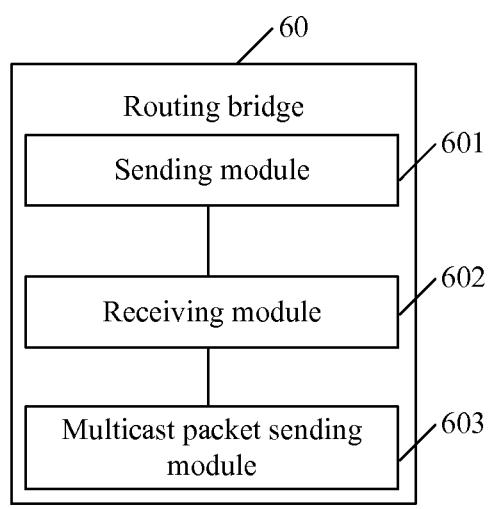
FIG. 6 is a schematic structural diagram of a RB according to an embodiment of the present disclosure.

FIG. 6 is a schematic structural diagram of a RB 60 according to an embodiment of the present disclosure. As shown in FIG. 6, the RB 60 includes a sending module 601, a receiving module 602, and a multicast packet sending module 603.

A sending module 601 is configured to separately send an LSP to each gateway that is on a TRILL network.

The LSP includes a network identifier of a Layer 2 virtual network and a multicast address. The LSP is used to enable each gateway to perform calculation on the network identifier and the multicast address that are in the LSP and to match a calculation result with information preconfigured that is on the gateway.

A receiving module 602 is configured to receive a notification message sent by a first gateway, where the first gateway is a gateway on the TRILL network and information preconfigured on the gateway matches a calculation result corresponding to a combination of the network identifier and the multicast address.

A 603 is configured to send a multicast packet corresponding to the multicast address to the first gateway, so that the first gateway forwards the multicast packet.

Further, if the first gateway is not a TRILL distribution tree root, the notification message is a first LSP including the network identifier and the multicast address.

Correspondingly, the receiving module 602 is configured to receive the first LSP sent by the first gateway.

Figure 6A:
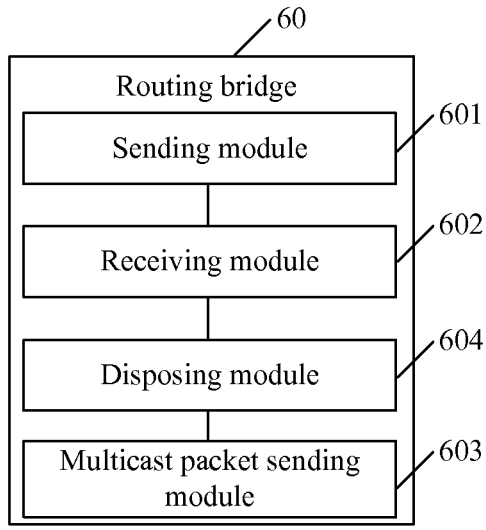
FIG. 6A is a schematic structural diagram of a RB according to an embodiment of the present disclosure.

As shown in FIG. 6A, the RB 60 further includes a disposing module 604 configured to dispose, according to the first LSP, the first gateway on a TRILL distribution tree corresponding to the network identifier and the multicast address.

The multicast packet sending module 603 is configured to send the multicast packet corresponding to the multicast address to the first gateway by using the TRILL distribution tree.

Further, if the first gateway is a TRILL distribution tree root, the notification message is an extended LSP including the network identifier and the multicast address and a correspondence between the network identifier and the multicast address and the TRILL distribution tree root.

Correspondingly, the receiving module 602 is configured to receive the extended LSP sent by the first gateway.

Figure 6B:
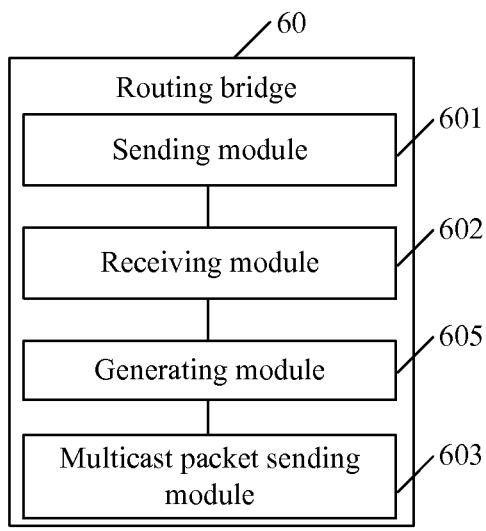
FIG. 6B is a schematic structural diagram of a RB according to an embodiment of the present disclosure.

As shown in FIG. 6B, the RB 60 further includes a generating module 605 configured to generate a local multicast entry according to the extended LSP.

The multicast packet sending module 603 is configured to send the multicast packet corresponding to the multicast address to the first gateway by using a TRILL distribution tree whose root is the first gateway according to the local multicast entry.

Figure 6C:
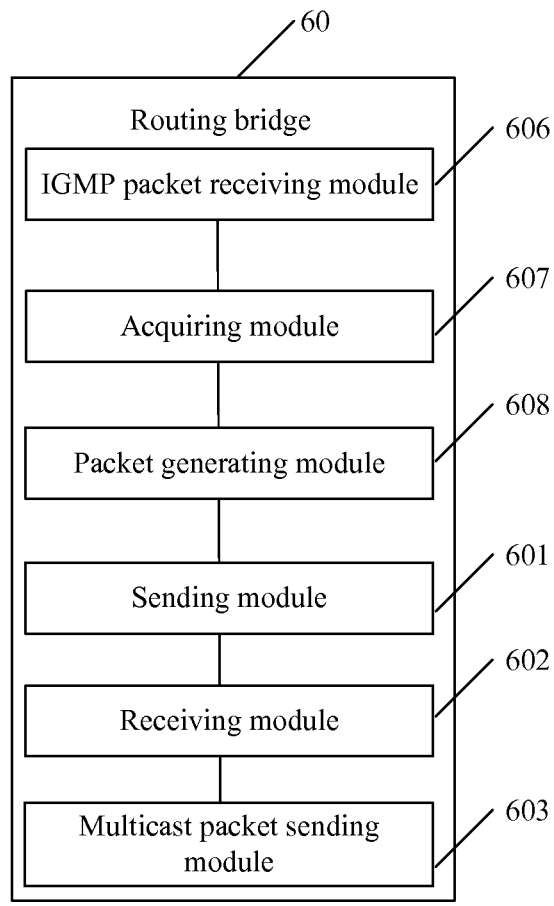
FIG. 6C is a schematic structural diagram of a RB according to an embodiment of the present disclosure.

Further, as shown in FIG. 6C, the RB 60 further includes an IGMP packet receiving module 606 configured to, before the sending module 601 sends the LSP to the gateway, receive, from an IGMP packet ingress port, an IGMP packet sent by a terminal; an acquiring module 607 configured to obtain a multicast address included in the IGMP packet and a network identifier of a Layer 2 virtual network on which the terminal is located; and a packet generating module 608 configured to form the LSP by encapsulating the multicast address and the network identifier.

The acquiring module 607 is configured to determine, according to a preset correspondence table of a port number of an ingress port and a network identifier of a Layer 2 virtual network, and a port number of the IGMP packet ingress port, the network identifier of the Layer 2 virtual network on which the terminal is located. The correspondence table of a port number of an ingress port and a network identifier of a Layer 2 virtual network is preset by an administrator, which is not limited by the present disclosure. For example, Table 1 is a preset correspondence table of a port number of an ingress port and a network identifier of a Layer 2 virtual network. For convenience of description, the network identifier of the Layer 2 virtual network is a 12-bit VLAN ID, or may be a 24-bit FGL, which is not limited by the present disclosure. As shown in Table 1, if the IGMP packet sent by the terminal is received from an ingress port with a port number being 50, it may be seen, according to a correspondence in Table 1, that the network identifier of the Layer 2 virtual network on which the terminal is located is VLAN 10.

According to a RB provided by the embodiment of the present disclosure, the RB separately sends an LSP to each gateway that is on a TRILL network, where the LSP includes a network identifier of a Layer 2 virtual network and a multicast address, and the LSP is used to enable each gateway to perform calculation on the network identifier and the multicast address that are in the LSP and to match a calculation result with information preconfigured on the gateway; the RB receives a notification message sent by a first gateway, and sends a multicast packet corresponding to the multicast address to the first gateway, so that the first gateway forwards the multicast packet. In this way, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

Figure 7:
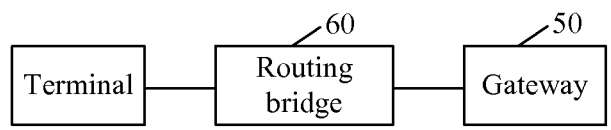
FIG. 7 is a schematic structural diagram of a system for transmitting a multicast packet across Layer 2 virtual networks on a TRILL network according to an embodiment of the present disclosure.

FIG. 7 is a schematic structural diagram of a system for transmitting a multicast packet across Layer 2 virtual networks on a TRILL network according to an embodiment of the present disclosure. As shown in FIG. 7, the system includes a terminal, a gateway 50, and a RB 60.

The terminal is a multicast packet sender (that is, a multicast source). The gateway 50 has a same function as the foregoing gateway 50, and no details are described herein again. The RB 60 has a same function as the foregoing RB 60, and no details are described herein again.

According to a system for transmitting a multicast packet across Layer 2 virtual networks on a TRILL network provided by the embodiment of the present disclosure, a terminal sends an IGMP packet to a RB; the RB acquires a multicast address included in the IGMP packet and a network identifier of a Layer 2 virtual network on which the terminal is located, and sends an LSP including the network identifier and the multicast address to a gateway that is on the TRILL network; the gateway performs calculation on the network identifier and the multicast address that are in the LSP, to obtain a calculation result corresponding to a combination of the network identifier and the multicast address; if determining that information preconfigured on the gateway matches the calculation result corresponding to the combination of the network identifier and the multicast address, the gateway sends a notification message to the RB that is on the TRILL network; the terminal sends a multicast packet to the RB; and the RB sends a multicast packet corresponding to the multicast address in the matched combination to the gateway that is in the matched combination, and the gateway forwards the multicast packet. A gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

Figure 8:
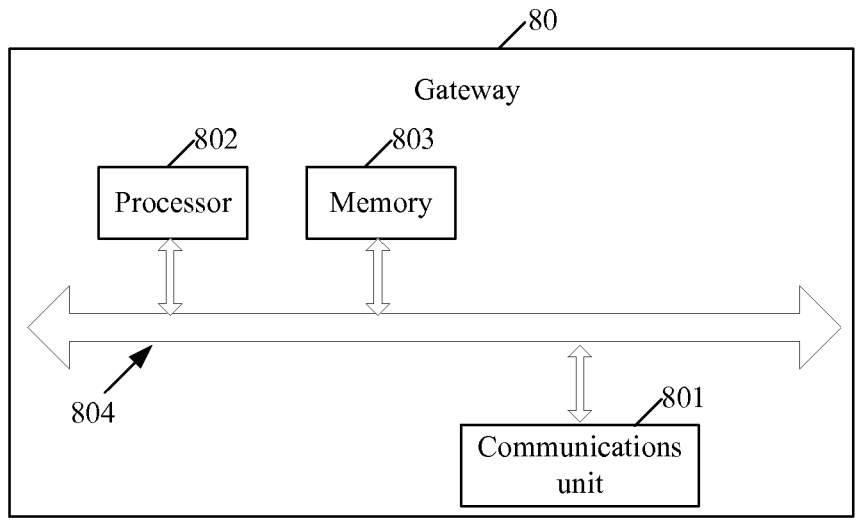
FIG. 8 is a schematic structural diagram of a gateway according to an embodiment of the present disclosure.

Referring to FIG. 8, FIG. 8 is a schematic structural diagram of a gateway 80 according to an embodiment of the present disclosure. As shown in FIG. 8, the gateway 80 may include a communications unit 801, a processor 802, and a memory 803. The communications unit 801, the processor 802, and the memory 803 are connected to and communicate with each other by using a communications bus 804.

The communications unit 801 is configured to perform data transmission between the communications unit 801 and an external network element.

The processor 802 may be a central processing unit (CPU).

The memory 803 may be a volatile memory, such as a random-access memory (RAM), may be a non-volatile memory, such as a read-only memory (ROM), a flash memory, a hard disk (HD), or a solid-state drive (SSD), or may be a combination of the foregoing kinds of memories, and provides an instruction and data for the processor 802.

The communications unit 801 is configured to receive an LSP sent by each RB.

Each LSP includes a network identifier of a Layer 2 virtual network and a multicast address.

The LSP may be a TRILL LSPDU.

The RB is any switch that is on a TRILL network, has a Layer 2 access function, and can receive a multicast packet sent by a terminal (a multicast source) to which the switch is connected.

The network identifier of the Layer 2 virtual network may be indicated by a 12-bit VLAN ID, or may be indicated by a 24-bit FGL.

The multicast address is any of class D IP addresses ranging from 224.0.0.0 to 239.255.255.255, and is used to identify a multicast group. The multicast group is a set of terminals that receive a multicast packet.

Preferably, the LSP is formed by encapsulating the multicast address and the network identifier, where the multicast address is obtained by the RB according to an IGMP packet that is sent by the terminal and received from an IGMP packet ingress port, and the network identifier is of the Layer 2 virtual network on which the terminal is located, and is obtained according to a port number of the ingress port and a preset correspondence table of a port number of an ingress port and a network identifier of a Layer 2 virtual network. The IGMP packet includes the multicast address.

The processor 802 is configured to separately perform calculation on the network identifier and the multicast address that are in each LSP received by the receiving module, to obtain a calculation result corresponding to each combination of the network identifier and the multicast address.

The communications unit 801 is further configured to, if the gateway determines that information preconfigured on the gateway matches a calculation result corresponding to a combination of the network identifier and the multicast address, send a notification message to each RB that is on the TRILL network, where the notification message includes the network identifier and the multicast address that are in the matched combination; and receive, from at least one RB, a multicast packet corresponding to the multicast address in the matched combination, and forward the multicast packet.

Further, the processor 802 is configured to separately perform data conversion on the network identifier and the multicast address that are in each LSP, and perform computation in combination with a total number of gateways that are on the TRILL network, to obtain the calculation result corresponding to each combination of the network identifier and the multicast address.

The network identifier may be a 12-bit VLAN ID, or may be a 24-bit FGL. Therefore, the processor 802 is configured to obtain, by calculating according to any calculation formula of the following (1) or (2), the calculation result corresponding to each combination of the network identifier and the multicast address.

(1) The network identifier is a 12-bit VLAN ID; the multicast address is a class D IP address Group Address; the total number of gateways is an integer k; the calculation result corresponding to the combination of the network identifier and the multicast address is m; and the processor 802 obtains, according to a formula m=(VLAN ID<<32+Group Address)%k, the calculation result corresponding to each combination of the network identifier and the multicast address, where "<<" indicates right shifting, "%" indicates performing a modulo operation, and m=(VLAN ID<<32+Group Address)%k indicates first right shifting the 12-bit VLAN ID by 32 bits, then adding it to the multicast address, and finally, determining a remainder as a value of m after a result of addition is divided by k.

(2) The network identifier is a 24-bit FGL; the multicast address is a class D IP address Group Address; the total number of gateways is an integer k; the calculation result corresponding to the combination of the network identifier and the multicast address is m; and the processor 802 obtains, according to a formula m=((FGL<<k%12|FGL)%k+(Group Address<<k%32|Group Address)%k)%k, the calculation result corresponding to each combination of the network identifier and the multicast address, where "<<" indicates right shifting, "%" indicates performing a modulo operation, "|" indicates an OR operation, and m=((FGL<<k%12|FGL)%k+(Group Address<<k%32|Group Address)%k)%k indicates performing an OR operation on a remainder that is obtained after the 24-bit FGL is right shifted by k bits and then divided by 12, and the 24-bit FGL, dividing an OR operation result by k to acquire a first remainder; performing an OR operation on a remainder that is obtained after the multicast address is right shifted by k bits and then divided by 32, and the multicast address, dividing an OR operation result by k to acquire a second remainder; then adding the first remainder and the second remainder; finally, determining a remainder as a value of m after an addition result is divided by k.

The calculation result m corresponding to the combination of the network identifier and the multicast address is in any manner of expression of the foregoing manners (1) and (2), but is not limited to the two manners of expression.

The information preconfigured on the gateway is a sequence number of the gateway. The sequence number is obtained by sorting, in an initialization phase of the TRILL network according to TRILL protocol system identifiers system IDs of the gateways that are on the TRILL network, all the gateways that are on the TRILL network according to a natural number sequence starting from 0 and ending at k−1.

Correspondingly, the communications unit 801 is configured to, if the sequence number of the gateway is equal to the calculation result m corresponding to the combination of the network identifier and the multicast address, send the notification message to each RB that is on the TRILL network.

Further, if the gateway determines that the information preconfigured on the gateway matches a calculation result corresponding to a combination of the network identifier and the multicast address, and the gateway is not a TRILL distribution tree root, the notification message is a first LSP including the network identifier and the multicast address that are in the matched combination.

Correspondingly, the communications unit 801 is configured to notify the network identifier and the multicast address that are in the matched combination to each RB that is on the TRILL network by using the first LSP, so that each RB on the TRILL network disposes, according to the first LSP, the gateway on the TRILL distribution tree corresponding to the network identifier and the multicast address that are in the matched combination, and sends the multicast packet corresponding to the multicast address in the matched combination to the gateway by using the TRILL distribution tree.

Further, if the gateway determines that the information preconfigured on the gateway matches a calculation result corresponding to a combination of the network identifier and the multicast address, and the gateway is a TRILL distribution tree root, the notification message is an extended LSP including the network identifier and the multicast address that are in the matched combination and a correspondence between the network identifier and the multicast address that are in the matched combination and the TRILL distribution tree root.

Correspondingly, the communications unit 801 is configured to notify, by using the extended LSP, the network identifier and the multicast address that are in the matched combination and the correspondence between the network identifier and the multicast address that are in the matched combination and the TRILL distribution tree root to each RB that is on the TRILL network, so that each RB on the TRILL network generates a local multicast entry according to the extended LSP, and sends the multicast packet corresponding to the multicast address in the matched combination to the gateway by using a TRILL distribution tree whose root is the gateway in the matched combination according to the local multicast entry.

According to a gateway provided by the embodiment of the present disclosure, after receiving an LSP that includes a Layer 2 virtual network identifier and a multicast address and that is sent by a RB, the gateway 80 separately performs calculation on the network identifier and the multicast address that are in each LSP, to obtain a calculation result corresponding to each combination of the network identifier and the multicast address; when determining that information preconfigured on the gateway matches a calculation result corresponding to a combination of the network identifier and the multicast address, the gateway sends a notification message to the RB, receives, from at least one RB, a multicast packet corresponding to the multicast address in the matched combination, and forwards the multicast packet. In this way, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

Figure 9:
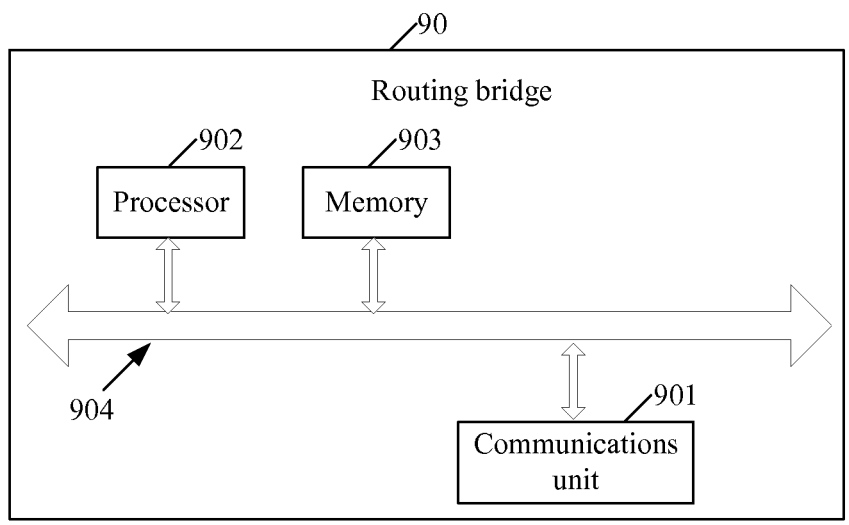
FIG. 9 is a schematic structural diagram of a RB according to an embodiment of the present disclosure.

Referring to FIG. 9, FIG. 9 is a schematic structural diagram of a RB 90 according to an embodiment of the present disclosure. As shown in FIG. 9, the RB 90 may include a communications unit 901, a processor 902, and a memory 903. The communications unit 901, the processor 902, and the memory 903 are connected to and communicate with each other by using a communications bus 904.

The communications unit 901 is configured to perform data transmission between the communications unit 901 and an external network element.

The processor 902 may be a CPU.

The memory 903 may be a volatile memory, such as a RAM, may be a non-volatile memory, such as a ROM, a flash memory, an HD, or an SSD, or may be a combination of the foregoing kinds of memories, and provides an instruction and data for the processor 902.

The communications unit 901 is configured to separately send an LSP to each gateway that is on a TRILL network, where the LSP includes a network identifier of a Layer 2 virtual network and a multicast address, and the LSP is used to enable each gateway to perform calculation on the network identifier and the multicast address that are in the LSP and to match a calculation result with information preconfigured on the gateway; receive a notification message sent by a first gateway, where the first gateway is a gateway on the TRILL network and information preconfigured on the gateway matches a calculation result corresponding to a combination of the network identifier and the multicast address; and send a multicast packet corresponding to the multicast address to the first gateway, so that the first gateway forwards the multicast packet.

Further, if the first gateway is not a TRILL distribution tree root, the notification message is a first LSP including the network identifier and the multicast address that are in the matched combination.

Correspondingly, the communications unit 901 is configured to receive the first LSP sent by the first gateway.

The processor 902 is configured to dispose, according to the first LSP, the first gateway on a TRILL distribution tree corresponding to the network identifier and the multicast address.

The communications unit 901 is further configured to send the multicast packet corresponding to the multicast address to the first gateway by using the TRILL distribution tree.

Further, if the first gateway is a TRILL distribution tree root, the notification message is an extended LSP including the network identifier and the multicast address and a correspondence between the network identifier and the multicast address and the TRILL distribution tree root.

Correspondingly, the communications unit 901 is configured to receive the extended LSP sent by the first gateway.

The processor 902 is configured to generate a local multicast entry according to the extended LSP.

The communications unit 901 is further configured to send the multicast packet corresponding to the multicast address to the first gateway by using a TRILL distribution tree whose root is the first gateway according to the local multicast entry.

Further, the communications unit 901 is further configured to, before the communications unit 901 sends the LSP to the gateway, receive, from an IGMP packet ingress port, an IGMP packet sent by a terminal.

The processor 902 is further configured to obtain a multicast address included in the IGMP packet and a network identifier of a Layer 2 virtual network on which the terminal is located; and form the LSP by encapsulating the multicast address and the network identifier.

The processor 902 is configured to determine, according to a preset correspondence table of a port number of an ingress port and a network identifier of a Layer 2 virtual network, and a port number of the IGMP packet ingress port, the network identifier of the Layer 2 virtual network on which the terminal is located. The correspondence table of a port number of an ingress port and a network identifier of a Layer 2 virtual network is preset by an administrator, which is not limited by the present disclosure. For example, Table 1 is a preset correspondence table of a port number of an ingress port and a network identifier of a Layer 2 virtual network. For convenience of description, the network identifier of the Layer 2 virtual network is a 12-bit VLAN ID, or may be a 24-bit FGL, which is not limited by the present disclosure. As shown in Table 1, if the IGMP packet sent by the terminal is received from an ingress port with a port number being 50, it may be seen, according to a correspondence in Table 1, that the network identifier of the Layer 2 virtual network on which the terminal is located is VLAN 10.

According to a RB provided by the embodiment of the present disclosure, the RB 90 separately sends an LSP to each gateway that is on a TRILL network, where the LSP includes a network identifier of a Layer 2 virtual network and a multicast address, and the LSP is used to enable each gateway to perform calculation on the network identifier and the multicast address that are in the LSP and to match a calculation result with information preconfigured on the gateway; the RB 90 receives a notification message sent by a first gateway, and sends a multicast packet corresponding to the multicast address to the first gateway, so that the first gateway forwards the multicast packet. In this way, a gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

Figure 10:
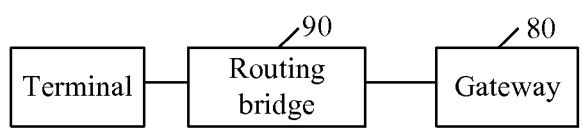
FIG. 10 is a schematic structural diagram of a system for transmitting a multicast packet across Layer 2 virtual networks on a TRILL network according to an embodiment of the present disclosure.

FIG. 10 is a schematic structural diagram of a system for transmitting a multicast packet across Layer 2 virtual networks on a TRILL network according to an embodiment of the present disclosure. As shown in FIG. 10, the system includes a terminal, a gateway 80, and a RB 90.

The terminal is a multicast packet sender (that is, a multicast source). The gateway 80 has a same function as the foregoing gateway 80, and no details are described herein again. The RB 90 has a same function as the foregoing RB 90, and no details are described herein again.

According to a system for transmitting a multicast packet across Layer 2 virtual networks on a TRILL network provided by the embodiment of the present disclosure, a terminal sends an IGMP packet to a RB; the RB acquires a multicast address included in the IGMP packet and a network identifier of a Layer 2 virtual network on which the terminal is located, and sends an LSP including the network identifier and the multicast address to a gateway that is on the TRILL network; the gateway performs calculation on the network identifier and the multicast address that are in the LSP, to obtain a calculation result corresponding to a combination of the network identifier and the multicast address; if determining that information preconfigured on the gateway matches the calculation result corresponding to the combination of the network identifier and the multicast address, the gateway sends a notification message to the RB that is on the TRILL network; the terminal sends a multicast packet to the RB; and the RB sends a multicast packet corresponding to the multicast address in the matched combination to the gateway that is in the matched combination, and the gateway forwards the multicast packet. A gateway that forwards a multicast packet is determined, among gateways, based on a Layer 2 virtual network identifier and a multicast group address. Different multicast packets sent from a same Layer 2 virtual network may have different multicast addresses, so that the different multicast packets on the same Layer 2 virtual network are not limited to be forwarded on a same gateway, and therefore when a large number of multicast packets on the Layer 2 virtual network need to be forwarded, a burden on a single gateway is reduced.

It may be clearly understood by a person skilled in the art that, for the purpose of convenient and brief description, for a detailed working process of the foregoing unit and system, reference may be made to a corresponding process in the foregoing method embodiments, and details are not described herein again.

In the several embodiments provided in the present application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of hardware in addition to a software functional unit.

Finally, it should be noted that the foregoing embodiments are merely intended for describing the technical solutions of the present disclosure other than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of the embodiments of the present disclosure.

What is claimed is:

1. A method for transmitting a multicast packet across Layer 2 virtual networks on a Transparent Interconnection of Lots of Links (TRILL) network, comprising:
receiving, by a gateway, a link state packet (LSP) sent by each routing bridge (RB), wherein each LSP comprises a network identifier of a Layer 2 virtual network and a multicast address;
separately performing, by the gateway, calculation on the network identifier and the multicast address that are in each LSP, to obtain a calculation result corresponding to each combination of the network identifier and the multicast address;
separately performing, by the gateway, data conversion on the network identifier and the multicast address that are in each LSP, and performing computation in combination with a total number of gateways that are on the TRILL network, to obtain the calculation result corresponding to each combination of the network identifier and the multicast address;
sending a notification message to each RB that is on the TRILL network when the gateway determines that information preconfigured on the gateway matches a calculation result corresponding to a combination of the network identifier and the multicast address, wherein the notification message comprises the network identifier and the multicast address that are in the matched combination;
receiving, by the gateway from at least one RB, a multicast packet corresponding to the multicast address in the matched combination; and
forwarding the multicast packet.

2. The method according to claim 1, wherein the network identifier is a 12-bit virtual local area network identifier (VLAN ID), wherein the multicast address is a class D Internet Protocol (IP) address Group Address, wherein the total number of gateways is an integer k, and wherein the calculation result corresponding to the combination of the network identifier and the multicast address is m, and m=(VLAN ID<<32+Group Address)%k, wherein "<<" indicates right shifting, and "%" indicates performing a modulo operation.

3. The method according to claim 1, wherein the network identifier is a 24-bit fine grained label (FGL), wherein the multicast address is a class D Internet Protocol (IP) address Group Address, wherein the total number of gateways is an integer k, and wherein the calculation result corresponding to the combination of the network identifier and the multicast address is m, and m=((FGL<<k%12|FGL)%k+(Group Address<<k%32|Group Address)%k)%k, wherein "<<" indicates right shifting, "%" indicates performing a modulo operation, and "|" indicates an OR operation.

4. The method according to claim 2, wherein the information preconfigured on the gateway is a sequence number of the gateway, wherein the sequence number is obtained by sorting, according to TRILL protocol system identifiers (system IDs) of the gateways that are on the TRILL network, all the gateways that are on the TRILL network according to a natural number sequence starting from 0 and ending at k−1, and wherein when the gateway determines that information preconfigured on the gateway matches a calculation result corresponding to a combination of the network identifier and the multicast address, sending a notification message to each RB that is on the TRILL network comprises sending the notification message to each RB that is on the TRILL network when the gateway determines that the sequence number of the gateway is equal to a calculation result m corresponding to the combination of the network identifier and the multicast address.

5. The method according to claim 1, wherein when the gateway determines that the information preconfigured on the gateway matches a calculation result corresponding to a combination of the network identifier and the multicast address, and the gateway is not a TRILL distribution tree root, the notification message is a first LSP comprising the network identifier and the multicast address that are in the matched combination, and when sending the notification message to each RB that is on the TRILL network comprises notifying, by the gateway, the network identifier and the multicast address that are in the matched combination to each RB that is on the TRILL network by using the first LSP.

6. The method according to claim 1, wherein when the gateway determines that the information preconfigured on the gateway matches a calculation result corresponding to a combination of the network identifier and the multicast address, and the gateway is a TRILL distribution tree root, the notification message is an extended LSP comprising the network identifier and the multicast address that are in the matched combination and a correspondence between the network identifier and the multicast address that are in the matched combination and the TRILL distribution tree root, and wherein sending the notification message to each RB that is on the TRILL network comprises notifying, by the gateway by using the extended LSP, the network identifier and the multicast address that are in the matched combination and the correspondence between the network identifier and the multicast address that are in the matched combination and the TRILL distribution tree root to each RB that is on the TRILL network.

7. A method for transmitting a multicast packet across Layer 2 virtual networks on a Transparent Interconnection of Lots of Links (TRILL) network, comprising:
separately sending, by a routing bridge, a link state packet (LSP) to each gateway that is on the TRILL network, wherein the LSP comprises a network identifier of a Layer 2 virtual network and a multicast address, and the LSP is used to enable each gateway to perform calculation on the network identifier and the multicast address that are in the LSP and to match a calculation result with information preconfigured on the gateway, wherein each gateway separately performs the calculation, each gateway separately performs data conversion on the network identifier and the multicast address that are in each LSP, and each gateway performs computation in combination with a total number of gateways that are on the TRILL network, to obtain the calculation result corresponding to each combination of the network identifier and the multicast address;
receiving, by the routing bridge, a notification message sent by a first gateway, wherein the first gateway is a gateway on the TRILL network and information preconfigured on the gateway matches a calculation result corresponding to a combination of the network identifier and the multicast address; and sending, by the routing bridge, a multicast packet corresponding to the multicast address to the first gateway.

8. The method according to claim 7, wherein when the first gateway is not a TRILL distribution tree root, the notification message is a first LSP comprising the network identifier and the multicast address, and wherein receiving, by the routing bridge, the notification message sent by the first gateway, and sending the multicast packet corresponding to the multicast address to the first gateway comprises:

receiving, by the routing bridge, the first LSP sent by the first gateway;

disposing, according to the first LSP, the first gateway on a TRILL distribution tree corresponding to the network identifier and the multicast address; and sending the multicast packet corresponding to the multicast address to the first gateway by using the TRILL distribution tree.

9. The method according to claim 7, wherein when the first gateway is a TRILL distribution tree root, the notification message is an extended LSP comprising the network identifier and the multicast address and a correspondence between the network identifier and the multicast address and the TRILL distribution tree root, and wherein receiving, by the routing bridge, the notification message sent by the first gateway, and sending the multicast packet corresponding to the multicast address to the first gateway comprises:

receiving, by the routing bridge, the extended LSP sent by the first gateway;

generating a local multicast entry according to the extended LSP; and sending the multicast packet corresponding to the multicast address to the first gateway by using a TRILL distribution tree whose root is the first gateway according to the local multicast entry.

10. A gateway, comprising:
a receiving module configured to receive a link state packet (LSP) sent by each routing bridge (RB) wherein each LSP comprises: a network identifier of a Layer 2 virtual network and a multicast address;

a calculation module configured to separately perform calculation on the network identifier and the multicast address that are in each LSP received by the receiving module, to obtain a calculation result corresponding to each combination of the network identifier and the multicast address;

the calculation module is configured to separately perform data conversion on the network identifier and the multicast address that are in each LSP received by the receiving module, and performing computation in combination with a total number of gateways that are on the TRILL network, to obtain the calculation result corresponding to each combination of the network identifier and the multicast address;

a sending module configured to, when the gateway determines that information preconfigured on the gateway matches a calculation result corresponding to a combination of the network identifier and the multicast address, send a notification message to each RB that is on a Transparent Interconnection of Lots of Links (TRILL) network, wherein the notification message comprises the network identifier and the multicast address that are in the matched combination;

a multicast packet receiving module configured to receive, from at least one RB, a multicast packet corresponding to the multicast address in the matched combination; and a multicast packet forwarding module configured to forward the multicast packet received by the multicast packet receiving module.

11. The gateway according to claim 10, wherein the network identifier is a 12-bit virtual local area network identifier (VLAN ID), wherein the multicast address is a class D Internet Protocol (IP) address Group Address, wherein the total number of gateways is an integer k, wherein the calculation result corresponding to the combination of the network identifier and the multicast address is m, and wherein the calculation module is configured to obtain, according to a formula m=(VLAN ID<<32+Group Address)%k, the calculation result corresponding to each combination of the network identifier and the multicast address, wherein "<<" indicates right shifting, and "%" indicates performing a modulo operation.

12. The gateway according to claim 10, wherein the network identifier is a 24-bit fine grained label (FGL) wherein the multicast address is a class D Internet Protocol (IP) address Group Address, wherein the total number of gateways is an integer k, wherein the calculation result corresponding to the combination of the network identifier and the multicast address is m, and wherein the calculation module is configured to obtain, according to a formula m=((FGL<<k%12|FGL)%k+(Group Address<<k%32|Group Address)%k)%k, the calculation result corresponding to each combination of the network identifier and the multicast address, wherein "<<" indicates right shifting, "%" indicates performing a modulo operation, and "|" indicates an OR operation.

13. The gateway according to claim 11, wherein the information preconfigured on the gateway is a sequence number of the gateway, wherein the sequence number is obtained by sorting, according to TRILL protocol system identifiers system IDs) of the gateways that are on the TRILL network, all the gateways that are on the TRILL network according to a natural number sequence starting from 0 and ending at k−1, and wherein the sending module is configured to, when the gateway determines that the sequence number of the gateway is equal to a calculation result m corresponding to a combination of the network identifier and the multicast address, send the notification message to each RB that is on the TRILL network.

14. The gateway according to claim 10, wherein when the gateway determines that the information preconfigured on the gateway matches a calculation result corresponding to a combination of the network identifier and the multicast address, and the gateway is not a TRILL distribution tree root, the notification message is a first LSP comprising the network identifier and the multicast address that are in the matched combination, and wherein the sending module is configured to notify the network identifier and the multicast address that are in the matched combination to each RB that is on the TRILL network by using the first LSP.

15. The gateway according to claim 10, wherein when the gateway determines that the information preconfigured on the gateway matches a calculation result corresponding to a combination of the network identifier and the multicast address, and the gateway is a TRILL distribution tree root, the notification message is an extended LSP comprising the network identifier and the multicast address that are in the matched combination and a correspondence between the network identifier and the multicast address that are in the matched combination and the TRILL distribution tree root, and wherein the sending module is configured to notify, by using the extended LSP, the network identifier and the multicast address that are in the matched combination and the correspondence between the network identifier and the multicast address that are in the matched combination and the TRILL distribution tree root to each RB that is on the TRILL network.

16. A routing bridge, comprising:
a sending module configured to separately send a link state packet (LSP) to each gateway that is on a Transparent Interconnection of Lots of Links (TRILL) network, wherein the LSP comprises a network identifier of a Layer 2 virtual network and a multicast address, and the LSP is used to enable each gateway to perform calculation on the network identifier and the multicast address that are in the LSP and to match a calculation result with information preconfigured on the gateway, wherein each gateway separately performs the calculation, each gateway separately performs data conversion on the network identifier and the multicast address that are in each LSP, and each gateway performs computation in combination with a total number of gateways that are on the TRILL network, to obtain the calculation result corresponding to each combination of the network identifier and the multicast address;

a receiving module configured to receive a notification message sent by a first gateway, wherein the first gateway is a gateway on the TRILL network and information preconfigured on the gateway matches a calculation result corresponding to a combination of the network identifier and the multicast address; and a multicast packet sending module configured to send a multicast packet corresponding to the multicast address to the first gateway.

17. The routing bridge according to claim 16, wherein when the first gateway is not a TRILL distribution tree root, the notification message is a first LSP comprising the network identifier and the multicast address, wherein the receiving module is configured receive the first LSP sent by the first gateway, wherein the routing bridge further comprises a disposing module configured to dispose, according to the first LSP, the first gateway on a TRILL distribution tree corresponding to the network identifier and the multicast address, and wherein the multicast packet sending module is configured to send the multicast packet corresponding to the multicast address to the first gateway by using the TRILL distribution tree.

18. The routing bridge according to claim 16, wherein when the first gateway is a TRILL distribution tree root, the notification message is an extended LSP comprising the network identifier and the multicast address and a correspondence between the network identifier and the multicast address and the TRILL distribution tree root, wherein the receiving module is configured to receive the extended LSP sent by the first gateway, wherein the routing bridge further comprises a generating module configured to generate a local multicast entry according to the extended LSP, and wherein the multicast packet sending module is configured to send the multicast packet corresponding to the multicast address to the first gateway by using a TRILL distribution tree whose root is the first gateway according to the local multicast entry.

* * * * *

UNITED STATES PATENT AND TRADEMARK OFFICE
CERTIFICATE OF CORRECTION

PATENT NO.         : 9,525,560 B2                                                          Page 1 of 1
APPLICATION NO.    : 14/748777
DATED              : December 20, 2016
INVENTOR(S)        : Weiguo Hao et al.

It is certified that error appears in the above-identified patent and that said Letters Patent is hereby corrected as shown below:

In the Claims

Column 26, Line 25, Claim 13 should read: "identifiers (system IDs) of the gateways that are on"

Signed and Sealed this
Twenty-first Day of March, 2017

Michelle K. Lee
*Director of the United States Patent and Trademark Office*